US006965544B2

(12) United States Patent
Watanabe et al.

(10) Patent No.: US 6,965,544 B2
(45) Date of Patent: Nov. 15, 2005

(54) ELECTRONIC TIMEPIECE

(75) Inventors: Mamoru Watanabe, Chiba (JP); Yuichi Shino, Chiba (JP); Tamotsu Ono, Chiba (JP); Kei Hirano, Chiba (JP)

(73) Assignee: Seiko Instruments Inc., Chiba (JP)

( * ) Notice: Subject to any disclaimer, the term of this patent is extended or adjusted under 35 U.S.C. 154(b) by 260 days.

(21) Appl. No.: 10/354,569

(22) Filed: Jan. 30, 2003

(65) Prior Publication Data

US 2003/0147311 A1 Aug. 7, 2003

(30) Foreign Application Priority Data

Feb. 1, 2002 (JP) ....................................... 2002-025634

(51) Int. Cl.[7] .......................... H01M 2/10; G04B 37/00

(52) U.S. Cl. ........................... 368/88; 368/203; 429/96; 429/100

(58) Field of Search ................................ 368/203–204, 368/276, 281, 309; 429/96–100

(56) References Cited

U.S. PATENT DOCUMENTS 2,907,810 A 10/1959 Petters et al. ............... 136/173
3,945,193 A * 3/1976 Yasuda et al. ................ 368/88
4,251,604 A 2/1981 Umemoto .................... 429/98
4,362,396 A * 12/1982 Perrot ........................ 368/203
4,763,308 A * 8/1988 Morata ........................ 368/88
4,821,249 A 4/1989 Ikuma et al. ................. 368/88
6,124,056 A * 9/2000 Kimura ...................... 429/100
6,527,584 B2 * 3/2003 Ninomiya ................... 439/500
6,603,670 B1 * 8/2003 Chien ......................... 361/801
6,722,916 B2 * 4/2004 Buccinna et al. ........... 439/500
6,733,327 B2 * 5/2004 Sugimoto et al. ........... 439/500
2003/0118893 A1 * 6/2003 Takahashi et al. ............ 429/99

FOREIGN PATENT DOCUMENTS

GB 2112562 7/1983

* cited by examiner

*Primary Examiner*—Randy Gibson
*Assistant Examiner*—Jeanne-Marguerite Goodwin
(74) *Attorney, Agent, or Firm*—Adams & Wilks

(57) ABSTRACT

To effectively prevent positional deviation of a battery. A hook-shaped member of a spring electrode terminal, and hook-shaped members of a spring electrode terminal are arranged in respective apices of a regular triangle to restrict movements of a battery in a direction along a cross section against the bias of a spring electrode terminal, which abuts against a negative surface of the battery. Battery abutments are arranged in respective apices of a substantially regular triangle to permit the bias of the respective spring electrode terminals to bias the battery toward the battery abutment, thus restricting positional deviation of the battery in a horizontal plane. When the battery is to be removed, a battery removal tool arranged near the hook-shaped member is inserted into a tool insertion portion to remove the battery.

13 Claims, 7 Drawing Sheets

O-B CROSS SECTION

ELECTRONIC TIMEPIECE

BACKGROUND OF THE INVENTION

The present invention relates to an electronic timepiece of a battery holding construction, in which a battery is used for an electric power source.

Conventionally, a battery holding construction for holding of a battery has been used in various battery-driven electronic timepieces such as wall electronic clocks, or bench electronic clocks, in addition to digital-display or analog-display electronic watches.

With for example, conventional analog electronic timepieces, a spring electrode terminal of negative polarity biases an underside (negative side) of a battery in a direction (in a direction along a cross section), in which the battery is lifted, whereby the spring electrode terminal is brought into contact with the battery on the negative side of the battery. A spring electrode terminal of positive polarity pressingly biases a side of the battery laterally (in a direction along a horizontal plane), whereby the spring electrode terminal of positive polarity is brought into contact with the battery on the positive side of the battery.

However, there has been caused a problem that the spring electrode terminal of negative polarity is liable to cause the battery to float to lead to contact failure. Also, since a contact area between the spring electrode terminal of positive polarity and the battery is small, there have been caused problems that the battery is unstable and is liable to incline, which leads to positional deviation of the battery.

As measures for solving the above problems, a method for holding a battery is conceivable, in which falling-off and positional deviation of the battery caused by a shock or the like are prevented by using a battery presser or the like for pressing the battery from above, and holding the battery in a state, in which positive and negative sides of the battery, respectively, are brought into press contact with the spring electrode of positive polarity and the spring electrode of negative polarity.

Since the battery cannot be taken out, however, in such method unless the battery presser is dismounted at the time of battery replacement, there is caused a problem that workability in battery replacement is lowered.

The invention has its object to surely prevent positional deviation of a battery. Also, the invention has its object to facilitate the work of battery replacement.

SUMMARY OF THE INVENTION

The invention provides an electronic timepiece including a battery, which is used as an electric power supply and includes a first surface, a second surface provided on a back surface side of the first surface, and a third surface provided on a side between the first surface and the second surface, a spring electrode terminal of one polarity, which is caused by the bias thereof to abut against the first surface of the battery, a spring electrode terminal of the other polarity, which is formed to extend from an electrode base fixed around the battery and which is caused by the bias thereof to abut against the third surface of the battery, the electronic timepiece characterized in that a third restricting member is formed to extend from the electrode base to abut against the second surface of the battery, and the spring electrode terminal abutting against the third surface comprises first and second spring electrode terminals, the first spring electrode terminal comprising a first battery abutment abutting against the third surface to bias the battery, and a first restricting member abutting against the second surface, the second spring electrode terminal comprising a second battery abutment abutting against the third surface to bias the battery, and a second restricting member abutting against the second surface, and the first, second and third restricting members restricting positional deviation of the battery against the bias of the spring electrode terminal abutting against the first surface. The third restricting member formed to extend from the electrode base fixed around the battery and abut against the second surface of the battery, the first spring electrode terminal comprising the first battery abutment abutting against the third surface to bias the battery, and the first restricting member abutting against the second surface, the second spring electrode terminal comprising the second battery abutment abutting against the third surface to bias the battery, and the second restricting member abutting against the second surface restrict positional deviation of the battery against the bias of the spring electrode terminal abutting against the first surface and a shock.

Here, the first battery abutment and the first restricting member, and the second battery abutment and the second restricting member, respectively, may be configured to be provided on ends of the first and second spring electrodes.

Also, the first, second and third restricting members may be configured to be disposed in respective apices of a triangle centering on the battery.

Also, the first, second and third restricting members may be configured to be arranged in respective apices of a substantially regular triangle centering on the battery.

Also, a battery abutment, against which the bias of the first and second spring electrode terminals causes the battery to abut, may be configured to be provided in the vicinity of the third restricting member.

Also, a battery abutment, against which the battery is caused by the bias of the first and second spring electrode terminals to abut, may be configured to be formed integrally on the third restricting member.

Also, the first, second and third battery abutments may be configured to be arranged in respective apices of a triangle centering on the battery.

Also, the first, second and third battery abutments may be configured to be arranged in respective apices of a substantially regular triangle centering on the battery.

Also, a tool insertion portion for insertion of a tool for removal of the battery may be configured to be provided in the vicinity of the third restricting member on the electrode base.

Also, a tool insertion portion for insertion of a tool for removal of the battery may be configured to be provided on the third restricting member.

Also, the first, second and third restricting members may be configured to be hook-shaped members.

Also, the spring electrode terminal abutting against the first surface of the battery may be configured to be a negative electrode terminal, and the first and second spring electrode terminals may be configured to be positive electrode terminals.

Also, the battery may be configured to be a button-shaped one.

DETAILED DESCRIPTION OF THE PREFERRED EMBODIMENTS

EXAMPLE 1

Figure 1:
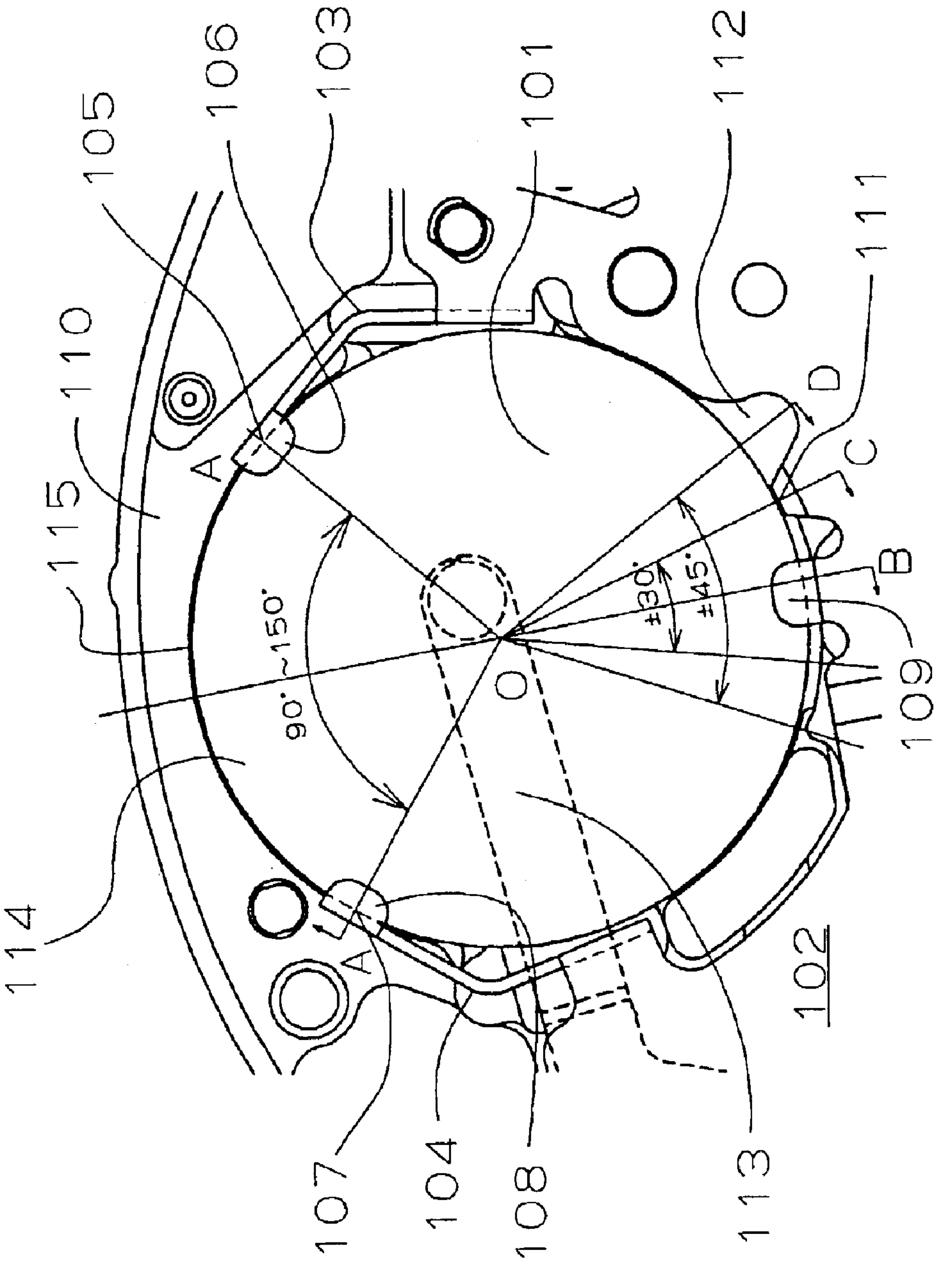
FIG. 1 is a front view showing an electronic timepiece according to a first embodiment of the invention.
Figure 2A:
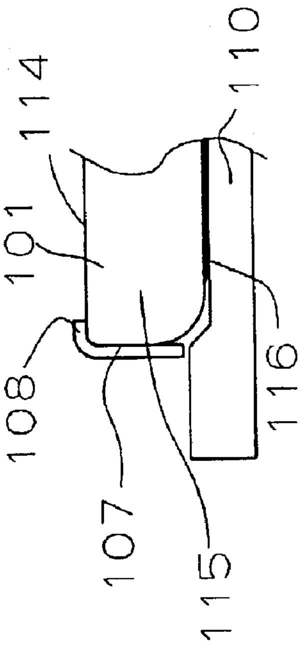
FIG. 2 are fragmentary, cross sectional views of FIG. 1.
Figure 2B:
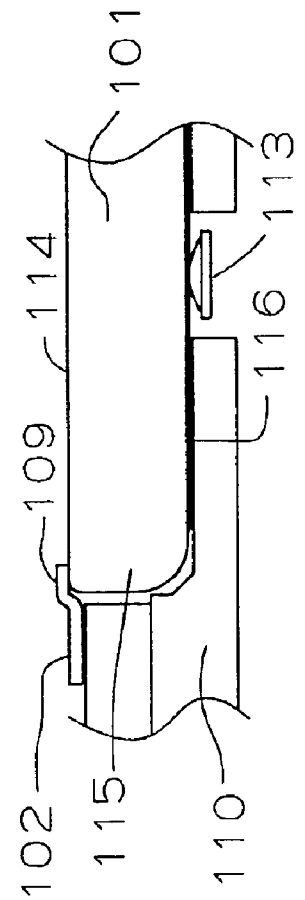
Figure 2D:
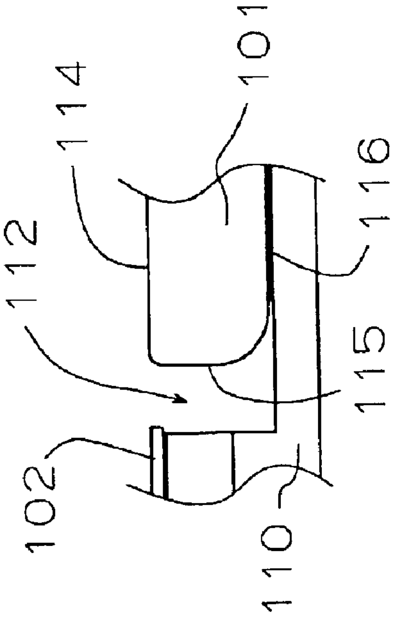
Figure 2C:
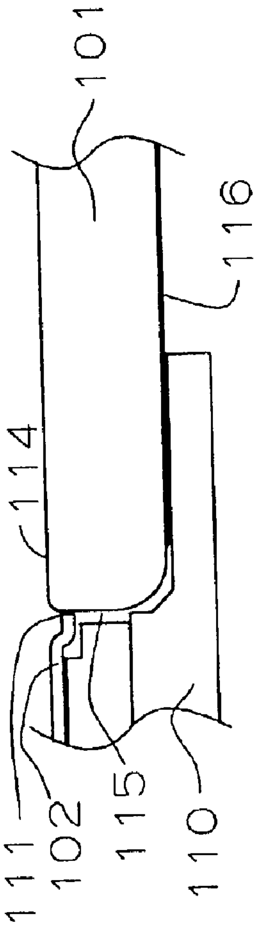

FIG. 1 is a front view showing an electronic timepiece according to a first embodiment of the invention, and FIG. 2 are fragmentary, cross sectional views of FIG. 1, FIG. 2A being a view showing a cross section taken along the line O-A and as viewed in a direction of an arrow, FIG. 2B being a view showing a cross section taken along the line O-B and as viewed in a direction of an arrow, FIG. 2C being a view showing a cross sectional view taken along the line O-C and as viewed in a direction of an arrow, and FIG. 2D being a view showing a cross section taken along the line O-D and as viewed in a direction of an arrow. In addition, the same parts in FIGS. 1 and 2 are denoted by the same reference numerals.

In FIGS. 1 and 2, the reference numeral 101 denotes a button-shaped battery being a kind of batteries, 102 an electrode base of positive polarity (one of polarities), 103, 104, respectively, spring electrode terminals of positive polarity (one of polarities), 105, 107, respectively, battery abutments, 106, 108, respectively, hook-shaped members formed integral with ends of the spring electrode terminals 103, 104, 109 a hook-shaped member formed integral with the electrode base 102, 110 a base plate, and 111 an battery abutment formed integral with the electrode base 102.

The battery 101 used as an electric power supply of the electronic timepiece includes a first surface 116 being a negative electrode, a second surface 114 being a positive electrode and provided on a back surface side of the first surface 116, and a third surface 115 being a positive electrode and defining a side surface between the first surface 116 and the second surface 114.

The electrode base 102 of positive polarity is fixed in a predetermined position around the battery 101.

A plurality of spring electrode terminals 103, 104 are formed integral on the electrode base 102 to extend therefrom. The respective spring electrode terminals 103, 104 possess the spring quality and the battery abutments 105, 107 provided on open side ends of the spring electrode terminals are caused by their biasing forces to abut against the third surface 115 of the battery 101. Also, the battery 101 is caused by the biasing forces of the respective spring electrode terminals 103, 104 to be biased toward the battery abutment 111 side (in a horizontal direction). Also, provided on open side ends of the respective spring electrode terminals 103, 104 are the hook-shaped members 106, 108 to abut against the second surface 114 of the battery 101.

The hook-shaped member 109 is formed integral with the electrode base 102 to extend therefrom.

The base plate 110 has a battery receiving portion having a slightly larger diameter than that of the battery 101, and the battery 101 is held in the battery receiving portion.

Provided in the vicinity of the hook-shaped member 109 on the electrode base 102 is a battery abutment 111, against which the battery 101 is caused by the biasing forces of the respective spring electrode terminals 103, 104 to abut.

Also, formed in the vicinity of the hook-shaped member 109 on the electrode base 102 is a tool insertion portion (notch) 112 for insertion of a tool for removal of a battery when the battery 101 is removed.

The hook-shaped members 106, 108, 109 are arranged to be positioned in respective apices of a regular triangle. The battery abutments 105, 107 as well as the respective hook-shaped members 106, 108 are provided on ends of the spring electrode terminals 103, 104, and the battery abutments 105, 107, 111 are arranged to be positioned in respective apices of a substantially regular triangle. Also, the tool insertion portion 112 is arranged in the vicinity of the hook-shaped member 109, and the battery abutments 105, 107 and the tool insertion portion 112 are also arranged to be positioned in respective apices of a substantially regular triangle.

A spring electrode terminal 113 of negative polarity constituting a third spring electrode terminal is arranged on a side of the first surface 116 of the battery 101 (a terminal side of negative polarity of the battery 101), and the spring electrode terminal 113 is caused by its biasing force to abut against the first surface 116. Also, the spring electrode terminal 113 causes its biasing force to bias the battery 101 toward the second surface 114 (in a direction along a cross section).

The spring electrode terminal 103 constitutes a first spring electrode terminal and the spring electrode terminal 104 constitutes a second spring electrode terminal. The hook-shaped members 106, 108, 109, respectively, constitute first, second and third restriction members. Also, the battery abutments 105, 107, 111, respectively, constitute first, second and third battery abutments.

With the battery holding configuration constructed in the above manner, the hook-shaped members 106, 108, 109 prevent movements of the battery 101 toward the second surface 114 (in a direction along a cross section) against a shock and the bias of the spring electrode terminal 113 even when a shock or the like is applied in a state, in which the battery 101 is received in the battery receiving portion. Accordingly, the battery 101 is restricted in positional deviation, such as floating in a direction along a cross section.

Also, the battery 101 is restricted in positional deviation in a horizontal direction by the battery abutment 105 of the spring electrode terminal 103, the battery abutment 107 of the spring electrode terminal 104 and the battery abutment 111. Even if a great shock were applied and so the battery 101 were caused to separate from the battery abutment 111 and the spring electrode terminals 103, 104, the plurality of spring electrode terminals 103, 104 are provided whereby the third surface 115 of the battery 101 contacts with at least one of the spring electrode terminals 103, 104 even in the case of separating from the battery abutment 111, so that it is possible to prevent occurrence of such a situation, in which an electronic timepiece is instantaneously made OFF from an electric power source.

In particular, according to the first embodiment, the hook-shaped members 106, 108, 109 are arranged to be positioned in apices of a regular triangle. Also, the battery abutments 105, 107, 111 are arranged to be positioned in respective apices of a substantially regular triangle.

Accordingly, even when the battery 101 tends due to the bias of the spring electrode terminal 113 and a shock to positionally shift toward the first surface 116 from the second surface 114, it is restricted by the hook-shaped members 106, 108, 109 positioned in respective apices of a regular triangle, so that it is restricted by equal forces at three points in a well-balanced manner. Also, even when the battery 101 tends due to a shock or the like to positionally shift in a horizontal direction (in a direction perpendicular to a cross section) in parallel to the first surface 116, it is restricted by the battery abutments 105, 107, 111 positioned in respective apices of a substantially regular triangle, so that it is restricted in positional deviation by equal forces at three points in a well-balanced manner.

Meanwhile, in the case where the battery 101 is to be removed, a battery removal tool such as tweezers is inserted into the tool insertion portion 112 to push out the battery 101 between the spring electrode terminals 103, 104 whereby the spring electrode terminals 103, 104 are bent and the battery 101 is removed.

At this time, since the tool insertion portion 112 is arranged in the vicinity of the battery abutment 111 and the hook-shaped member 109, it becomes possible to easily remove the battery 101.

In the case where the battery 101 is to be received in the battery receiving portion, the battery 101 is pushed against both the spring electrode terminals 103, 104 to flex the spring terminals 103, 104 in a state, in which the battery 101 is inserted under the hook-shaped members 106, 108, and then the battery 101 is inserted and arranged under the hook-shaped member 109, whereby reception of the battery 101 is completed. Thereby, it is possible t easily receive the battery 101 and to easily perform exchange of a battery.

In addition, while it is ideal in terms of holding and removal of the battery 101 that the battery abutment 105 and the hook-shaped member 106 are positioned in a first apex of a regular triangle, the battery abutment 107 and the hook-shaped member 108 are positioned in a second apex of the regular triangle, and the hook-shaped member 109, the battery abutment 111, and the tool insertion portion 112 are positioned in a third apex of the regular triangle, these elements may be positioned in apices of triangles having different shapes and there is obtained a practically adequate effect when they are arranged substantially in apices of a regular triangle (substantially regular triangle) as described below.

More specifically, as shown in FIG. 1, an angle defined between the hook-shaped members 106, 108 about a center O, around which the battery 101 is held, is positionally variable in the range of 90 to 150 degrees. Also, the hook-shaped member 109 and the battery abutment 111 are positionally variable in the range of −30 to +30 degrees about a bisector of an angle defined between the hook-shaped members 106, 108 about the center O. Also, the tool insertion portion 112 is positionally variable in the range of −45 to +45 degrees about a bisector of an angle defined between the hook-shaped members 106, 108 about the center O.

EXAMPLE 2

Subsequently, an explanation will be given to an electronic timepiece according to a second embodiment of the invention.

Figure 3:
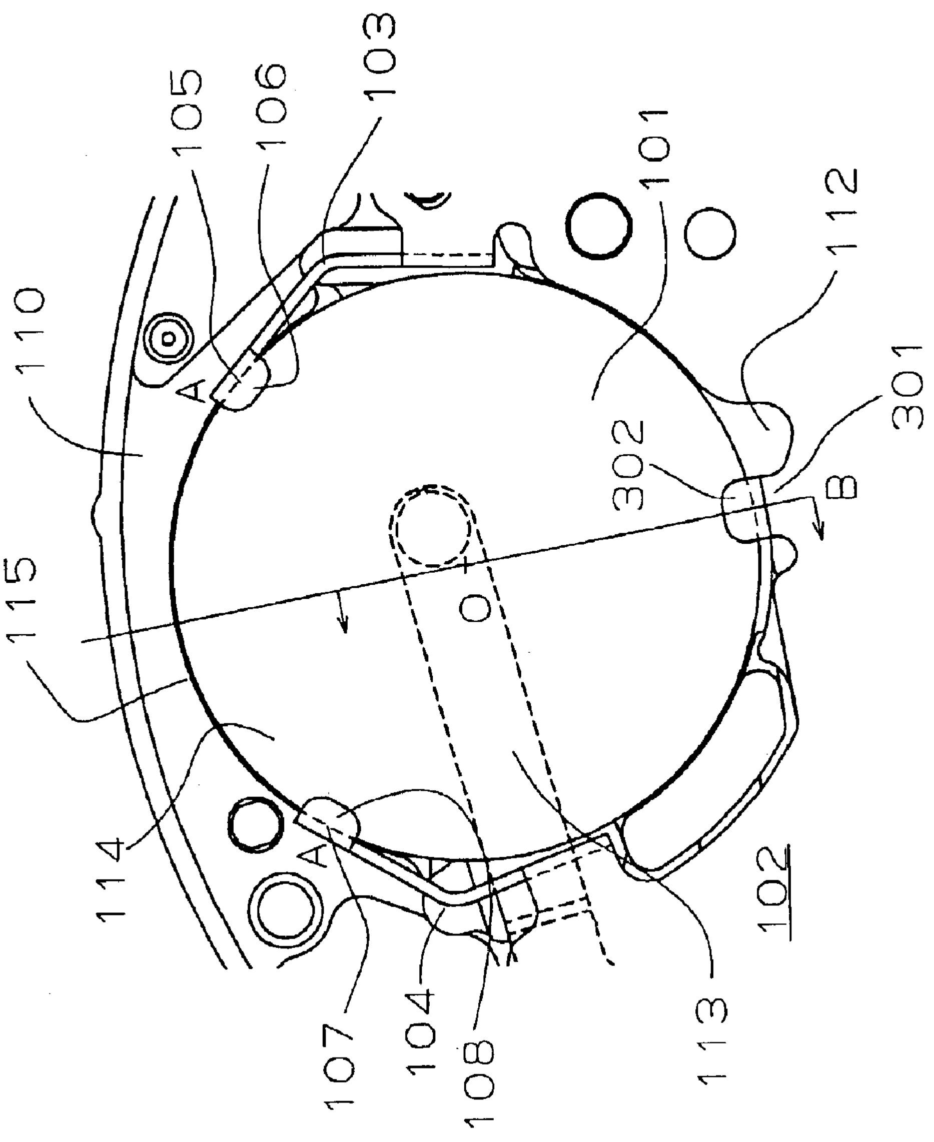
FIG. 3 is a front view showing an electronic timepiece according to a second embodiment of the invention.
Figure 4:
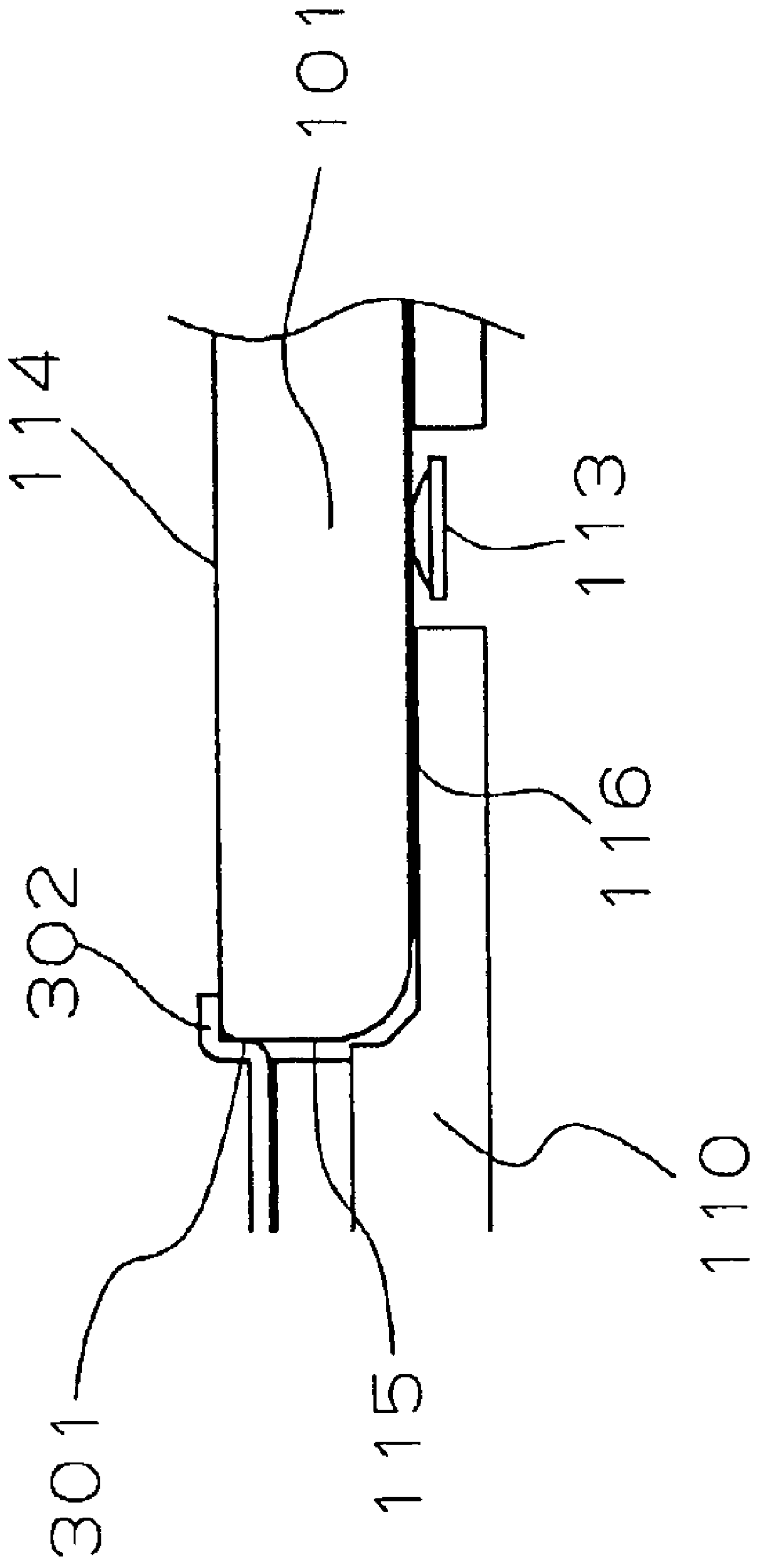
FIG. 4 is a fragmentary, cross sectional view of FIG. 3.

FIG. 3 is a front view showing the electronic timepiece according to the second embodiment of the invention, and FIG. 4 is a view showing a cross section taken along the line O-B as viewed in a direction of an arrow in FIG. 3. In addition, the same parts in FIGS. 3 and 4 are denoted by the same reference numerals, and the same parts as those in FIGS. 1 and 2 are denoted by the same reference numerals.

The second embodiment is different from the first embodiment in that the hook-shaped member 109 and the battery abutment 111 are provided in positions spaced from each other in a horizontal plane in the first embodiment, while a battery abutment 301 and a hook-shaped member 302 constituting a restriction member are provided in the same position in a horizontal plane in the second embodiment. More specifically, a plate-shaped portion formed to extend from the electrode base 102 is bent to have an L-shaped cross section, whereby the battery abutment 301 and the hook-shaped member 302 are formed integrally on the electrode base 102.

A tool insertion portion 112 is formed in the vicinity of the battery abutment 301 and the hook-shaped member 302 on the electrode base 102.

With such configuration, the hook-shaped members 106, 108, 302 can be positioned in respective apices of a regular triangle, and the battery abutments 105, 107, 301 can be also positioned in respective apices of a regular triangle, so that the battery 101 can be held by equal forces in a well-balanced manner. Actions and so on in the case of removing the battery 101 are the same as those in the first embodiment.

In addition, while it is ideal in terms of holding and removal of the battery 101 that the battery abutment 105 and the hook-shaped member 106 are positioned in a first apex of a regular triangle, the battery abutment 107 and the hook-shaped member 108 are positioned in a second apex of the regular triangle, and the hook-shaped member 302, the battery abutment 301, and the tool insertion portion 112 are positioned in a third apex of the regular triangle, these elements may be positioned in apices of triangles having different shapes and there is obtained a practically adequate effect when they are arranged substantially in apices of a substantially regular triangle (approximately regular triangle) as described below.

More specifically, in the second embodiment, like the first embodiment, an angle defined between the hook-shaped members 106, 108 about a center O, around which the battery 101 is held, is positionally variable in the range of 90 to 150 degrees. Also, the hook-shaped member 302 and the battery abutment 301 are positionally variable in the range of −30 to +30 degrees about a bisector of an angle defined between the hook-shaped members 106, 108 about the center O. Also, the tool insertion portion 112 is positionally variable in the range of −45 to +45 degrees about a bisector of an angle defined between the hook-shaped members 106, 108 about the center O.

EXAMPLE 3

Subsequently, an explanation will be given to an electronic timepiece according to a third embodiment of the invention.

Figure 5:
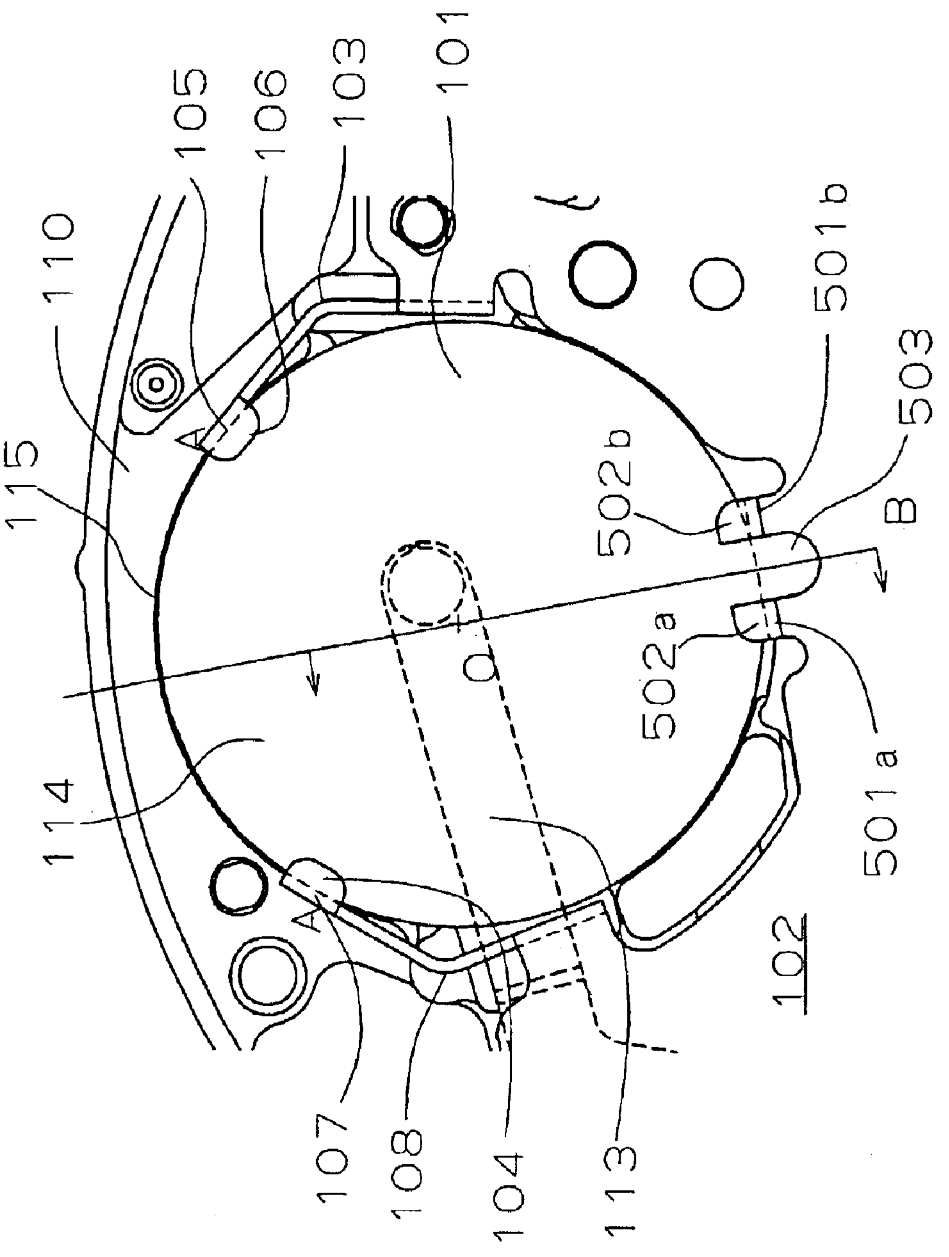
FIG. 5 is a front view showing an electronic timepiece according to a third embodiment of the invention.
Figure 6:
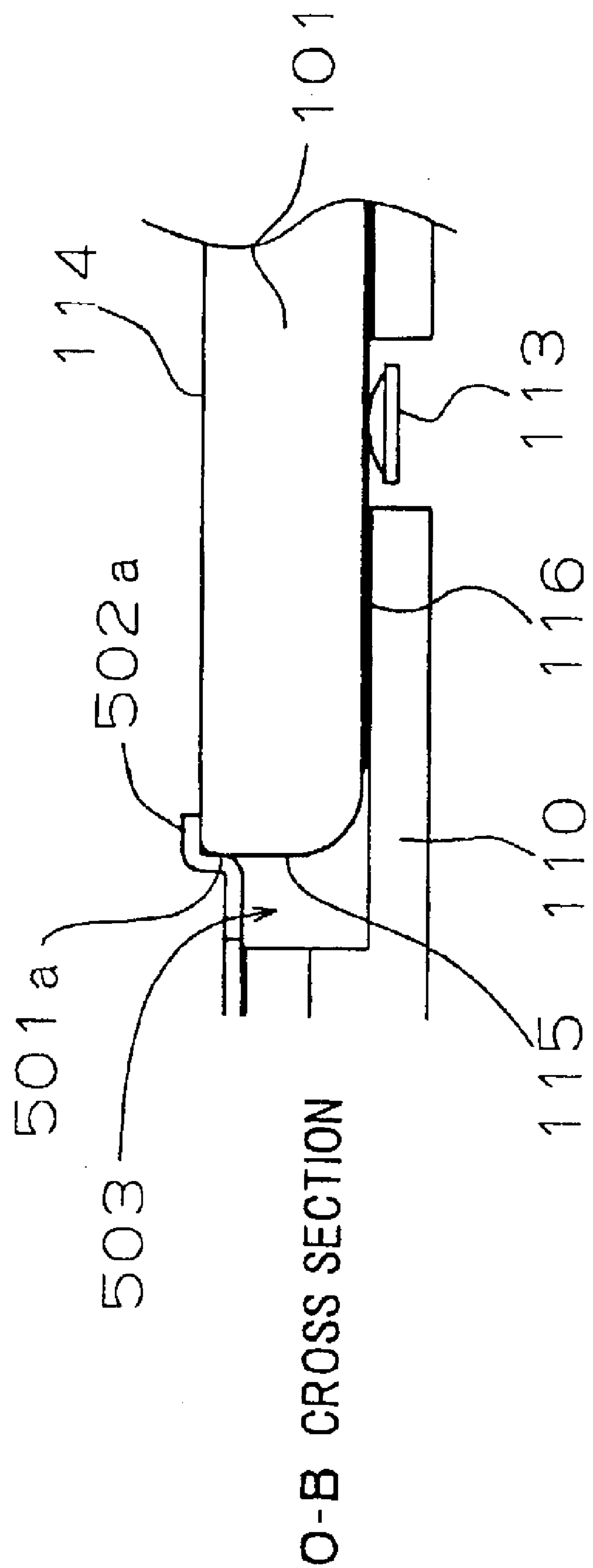
FIG. 6 is a fragmentary, cross sectional view of FIG. 5.

FIG. 5 is a front view showing the electronic timepiece according to the third embodiment of the invention, and FIG. 6 is a view showing a cross section taken along the line O-B as viewed in a direction of an arrow in FIG. 5. In addition, the same parts in FIGS. 5 and 6 are denoted by the same reference numerals, and the same parts as those in FIGS. 1 to 4 are denoted by the same reference numerals.

The third embodiment is different from the second embodiment in that the battery abutment 301 and the hook-shaped member 302 are provided in the same position in a horizontal plane and the tool insertion portion 112 is provided in the vicinity of and spaced from the battery abutment 301 and the hook-shaped member 302 in the second embodiment, while a battery abutment 501 (501*a*, 501*b*), a hook-shaped member 502 (502*a*, 502*b*) constituting restriction members and the tool insertion portion 503 are provided in the same position in a horizontal plane in the third embodiment.

More specifically, the battery abutment 501 (501*a*, 501*b*) and the hook-shaped member 502 (502*a*, 502*b*) are formed integrally on the electrode base 102 by bending a plate-shaped portion, which is formed to extend from the electrode base 102, in an L-shaped cross section, and a tool insertion portion 503 is formed by cutting off the battery abutment 501 (501*a*, 501*b*) and the hook-shaped member 502 (502*a*,

502*b*). Accordingly, the tool insertion portion 503 formed by the cut-off portion is interposed between the plurality of the battery abutments 501*a*, 501*b* and interposed between the plurality of the hook-shaped members 502*a*, 502*b*.

With such configuration, the hook-shaped members 106, 108, 502 can be positioned in respective apices of a regular triangle, and the battery abutments 105, 107, 501 can be also positioned in respective apices of a regular triangle, so that the battery 101 can be held by equal forces in a well-balanced manner. Actions and so on in the case of removing the battery 101 are the same as those in the first embodiment.

In addition, while it is ideal in terms of holding and removal of the battery 101 that the battery abutment 105 and the hook-shaped member 106 are positioned in a first apex of a regular triangle, the battery abutment 107 and the hook-shaped member 108 are positioned in a second apex of the regular triangle, and the hook-shaped member 502, the battery abutment 501, and the tool insertion portion 503 are positioned in a third apex of the regular triangle, these elements may be positioned in apices of triangles having different shapes and there is obtained a practically adequate effect when they are arranged substantially in apices of a substantially regular triangle (approximately regular triangle) as described below.

More specifically, in the third embodiment, like the first embodiment, an angle defined between the hook-shaped members 106, 108 about a center O, around which the battery 101 is held, is positionally variable in the range of 90 to 150 degrees. Also, the battery abutment 501, the hook-shaped member 502, and the tool insertion portion 503 are positionally variable in the range of −30 to +30 degrees about a bisector of an angle defined between the hook-shaped members 105, 108 about the center O.

As described above, the embodiment of the invention provides an electronic timepiece comprising a battery 101, which is used as an electric power supply and includes a negative electrode surface 116, a positive electrode surface 114 provided on a back surface side of the negative electrode surface 116, and a positive electrode side surface 115 provided between the negative electrode surface 116 and the positive electrode surface 114, a spring electrode terminal 113 of one polarity (negative), which is caused by its biasing force to abut against the negative electrode surface 116, a spring electrode terminal of the other polarity (positive), which is formed to extend from an electrode base 102 of positive polarity fixed around the battery 101 and which is caused by its biasing force to abut against the positive electrode side surface 115, and a third restricting member 109, 302, 502 formed to extend from the electrode base 102 fixed around the battery 101 and to abut against the second surface 114 of the battery 101, and wherein the spring electrode terminal abutting against the third surface 115 comprises first and second spring electrode terminals 103, 104, the first spring electrode terminal 103 comprising a first battery abutment 105 abutting against the third surface 115 to bias the battery 101, and a first restricting member 106 abutting against the second surface 114, the second spring electrode terminal 104 comprising a second battery abutment 107 abutting against the third surface 115 to bias the battery 101, and a second restricting member 108 abutting against the second surface 114, and the first, second and third restricting members 106, 108, 109 restricting positional deviation of the battery 101 against the bias of the spring electrode terminal 113 abutting against the first surface 116. Accordingly, it is possible to effectively prevent positional deviation of the battery 101.

Here, the first, second and third restricting members 106, 108, 109, 302, 502 are positioned in respective apices of a triangle (for example, a regular triangle or a substantially regular triangle) centering on the battery 101. Accordingly, the battery 101 can be held in a well-balanced manner.

Also, the tool insertion portion 112 for insertion of a tool for removal of the battery 101 is provided in the vicinity of the third restricting member 109, 302 on the electrode base 102 fixed around the battery 101. Alternatively, provided on the third restricting member 502 is the tool insertion portion 503 for insertion of a tool for removal of the battery 101. Accordingly, the work for replacement of the battery 101 is made easy.

Also, provided in the vicinity of the third restricting member 109 is the battery abutment 111, against which the battery 101 is caused by the biasing forces of the first and second spring electrode terminals 103, 104 to abut. Alternatively, formed integrally on the third restricting member 302, 502 is the battery abutment 301, 501, against which the battery 101 is caused by the biasing forces of the first and second spring electrode terminals 103, 104 to abut.

Accordingly, the battery 101 can be held in a well-balanced manner.

In addition, while the embodiment has been described taking a button battery as an example of the battery 101, it is applicable to batteries of other configurations.

According to the invention, it is possible to surely prevent positional deviation of a battery. Also, the work for replacement of a battery is made easy.

What is claimed is:

1. An electronic timepiece comprising:

a battery for using as an electric power supply having a first surface, a second surface provided on a back surface side of the first surface, and a third surface provided on a side between the first surface and the second surface;

a spring electrode terminal of one polarity caused by the bias thereof to abut against the first surface of the battery; and a spring electrode terminal of the other polarity formed to extend from an electrode base fixed around the battery and which is caused by the bias thereof to abut against the third surface of the battery, wherein a third restricting member is formed to extend from the electrode base to abut against the second surface of the battery, and the spring electrode terminal abutting against the third surface comprises first and second spring electrode terminals, the first spring electrode terminal comprising a first battery abutment abutting against the third surface to bias the battery, and a first restricting member abutting against the second surface, the second spring electrode terminal comprising a second battery abutment abutting against the third surface to bias the battery, and a second restricting member abutting against the second surface, and the first, second and third restricting members restricting positional deviation of the battery against the bias of the spring electrode terminal abutting against the first surface.

2. An electronic timepiece according to claim 1, wherein the first battery abutment and the first restricting member, and the second battery abutment and the second restricting member, respectively, are provided on ends of the first and second spring electrode terminals.

3. An electronic timepiece according to claim 1, wherein the first, second and third restricting members are disposed in respective apices of a triangle centering on the battery.

4. An electronic timepiece according to claim 1, wherein the first, second and third restricting members are arranged in respective apices of a substantially regular triangle centering on the battery.

5. An electronic timepiece according to claim 1, wherein a battery abutment, against which the bias of the first and second spring electrode terminals causes the battery to abut, is provided in the vicinity of the third restricting member.

6. An electronic timepiece according to claim 5, wherein the first, second and third battery abutments are arranged in respective apices of a triangle centering on the battery.

7. An electronic timepiece according to claim 5, wherein the first, second and third battery abutments are arranged in respective apices of a substantially regular triangle centering on the battery.

8. An electronic timepiece according to claim 1, wherein formed integrally on the third restricting member is a battery abutment, against which the battery is caused by the bias of the first and second spring electrode terminals to abut.

9. An electronic timepiece according to claim 1, wherein a tool insertion portion for insertion of a tool for removal of the battery is provided in the vicinity of the third restricting member on the electrode base.

10. An electronic timepiece according to claim 1, wherein a tool insertion portion for insertion of a tool for removal of the battery is provided on the third restricting member.

11. An electronic timepiece according to claim 1, wherein the first, second and third restricting members are hook-shaped members.

12. An electronic timepiece according to claim 1, wherein the spring electrode terminal abutting against the first surface is a negative electrode terminal, and the first and second spring electrode terminals are positive electrode terminals.

13. An electronic timepiece according to claim 1, wherein the battery is a button-shaped one.

* * * * *